United States Patent
Trajkovic et al.

(10) Patent No.: US 6,683,539 B2
(45) Date of Patent: Jan. 27, 2004

(54) COMPUTER VISION BASED PARKING ASSISTANT

(75) Inventors: Miroslav Trajkovic, Ossining, NY (US); Antonio J. Colmenarez, Maracaibo (VE); Srinivas Gutta, Yorktown Heights, NY (US); Karen I. Trovato, Putnam Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 174 days.

(21) Appl. No.: 10/029,806

(22) Filed: Dec. 27, 2001

(65) Prior Publication Data

US 2003/0122687 A1 Jul. 3, 2003

(51) Int. Cl.[7] .................................. B60Q 1/48
(52) U.S. Cl. ................. 340/932.2; 340/436; 340/437; 180/271
(58) Field of Search .................. 340/932.2, 933, 340/958, 436, 437, 435; 180/271

(56) References Cited

U.S. PATENT DOCUMENTS

| | | | | |
|---|---|---|---|---|
| 4,249,160 A | * | 2/1981 | Chilvers | 340/902 |
| 4,302,057 A | * | 11/1981 | Durling | 303/7 |
| 4,424,651 A | * | 1/1984 | Lee et al. | 52/175 |
| 4,436,176 A | * | 3/1984 | Cota et al. | 180/287 |
| 4,561,064 A | * | 12/1985 | Bruggen et al. | 702/159 |
| 4,879,553 A | * | 11/1989 | Righi | 340/932.2 |
| 4,931,930 A | | 6/1990 | Shyu et al. | 364/424.01 |
| 5,469,676 A | * | 11/1995 | Colsman | 52/174 |
| 5,504,314 A | * | 4/1996 | Farmont | 235/384 |
| 5,663,879 A | | 9/1997 | Trovato et al. | 701/2 |
| 5,835,881 A | | 11/1998 | Trovato et al. | 701/211 |
| 5,870,303 A | | 2/1999 | Trovato et al. | 700/61 |
| 5,889,472 A | * | 3/1999 | Nagel | 340/825.31 |
| 5,980,185 A | * | 11/1999 | Vita | 414/254 |
| 6,223,847 B1 | | 5/2001 | Sgimizu et al. | 180/204 |

FOREIGN PATENT DOCUMENTS

| | | | | |
|---|---|---|---|---|
| DE | 19646559 A | 5/1998 | | B60Q/9/00 |
| DE | 19809416 A | 9/1999 | | B60Q/9/00 |
| DE | 20102950 U | 8/2001 | | B62D/1/24 |
| FR | 2806998 A1 | 10/2001 | | B62D/1/18 |

* cited by examiner

*Primary Examiner*—Daryl Pope
(74) *Attorney, Agent, or Firm*—Aaron Waxler

(57) ABSTRACT

A computer-based assisted parking system and method for parking a vehicle into a parking space includes at least one sensor arranged to sense a position of the vehicle to be parked in a predetermined area adjacent the vehicle; a sensing system for at least two-dimensional reconstruction of feedback received from the one sensor; a path planning system for determining whether positions of other vehicles adjacent the parking space provide sufficient clearance for the vehicle to be parked and providing a planned path indicating how the vehicle to be parked will be maneuvered; a control system for controlling maneuvering of the vehicle to be parked based on the planned path determined by the path planning system, and the control system controls vehicle steering, direction, speed, and application of brakes, so that the vehicle to be parked is maneuvered into the parking space. Alternatively, directions may be given as the vehicle is parked under the control of the driver.

29 Claims, 3 Drawing Sheets

COMPUTER VISION BASED PARKING ASSISTANT

BACKGROUND OF THE INVENTION

1. Field of the Invention

The present invention relates to automated parking assistant systems.

2. Description of the Related Art

In the prior art, there have been some attempts at automatic control of vehicle motion. For example, one of the present inventors obtained U.S. Pat. No. 5,870,303 to Trovato et al. (which is hereby incorporated by reference as background material) disclosing a method and apparatus for controlling maneuvers of a vehicle. In this patent, maneuvering of the vehicle is planned in the presence of obstacles using a three-dimensional configuration space. Axes of the configuration space correspond to X and Y coordinate locations of the rear differential (center of the axle) and angle of the vehicle.

In another patent in which one of the present inventors has obtained (U.S. Pat. No. 5,835,881 to Trovato et al., which is hereby incorporated by reference as background material) discloses a portable system for providing voice driving directions. A computer determines a route between an origin and a destination and using an electronic maps and GPS (Global Positioning System), compares the GPS position to the spatial position and provides spoken directions for the driver at the appropriate time period.

In yet another patent, (U.S. Pat. No. 5,663,879 to Trovato et al., which is hereby incorporated by reference as background material) a method and apparatus for smooth control of a vehicle includes providing direction arrows that point to subsequent direction arrows on the same fiber are concatenated so that any error is smoothed over a longer motion.

However, in all of the above, as well in all of the prior art, there has not been an attempt to providing automatic controls for parking a vehicle.

SUMMARY OF THE INVENTION

The present invention provides a system for automatic parking of a vehicle heretofore unknown in the prior art. The parking can be directed by voice commands, or there can be computer control of the steering and drive mechanisms.

A computer-based assisted parking system for parking a vehicle into a parking space may comprise:
- at least one sensor arranged to sense at least one of: (1) a position of the vehicle to be parked; and (2) whether an obstacle is present in a predetermined area adjacent to the vehicle;
- a sensing system for at least two-dimensional reconstruction of feedback received from said at least one sensor;
- a path planning system for determining whether positions of other vehicles adjacent the parking space provide sufficient clearance for the vehicle to be parked and providing a planned path indicating how the vehicle to be parked will be maneuvered;
- a control system for controlling maneuvering of the vehicle to be parked based on the planned path determined by said path planning system, said control system controls vehicle steering, direction (e.g. forward, reverse) speed, and application of brakes, so that the vehicle to be parked is maneuvered into the parking space.

The sensing system may generate X,Y and $\phi$ coordinates so that coordinates X1,Y1 and X2,Y2 are used to calculate the distance of the parking spot, and a series of steps to park the vehicle can either be generated for the coordinates when the driver is about to park, if the series of steps to park within a predetermined size range of a parking spot is not already in storage. Once the steps are in storage, these steps can be quickly recalled by the computer when a similarly sized spot is sensed for the particular vehicle in question. In fact, manufacturers of automobiles may preprogram different maneuvering steps for certain sized parking spots based on a car's contour, and/or outer corner dimensions.

The control system may automatically park the vehicle after a driver of the vehicle to be parked affirms that said path planning system has indicated that there is sufficient clearance for parking the vehicle.

The system may include a switch in communication with at least one of the path planning system and the control system, so that the vehicle is parked automatically when the driver affirms receipt of the determination by the path planning system of sufficient clearance for parking the vehicle.

The control system may include an actuator for initiating parking of the vehicle. The actuator may be voice activated.

The path planning system may include a visual indicator to alert a driver of sufficient clearance for parking by the vehicle.

The path planning system may include an audio indicator to alert a driver of sufficient clearance for parking by the vehicle.

The control system may further include an emergency stop feature to suspend parking of a vehicle if an object is sensed in the path determined by the path planning system. Alternative to the automatic steering and movement of the vehicle, the control system may provide sequential directions to the driver for maneuvering the vehicle into the parking spot.

The control system may provide the sequential directions by audio. The audio providing the directions may comprise a synthesized voice.

The directions provided by the control system may include reporting distance intervals between an end of the vehicle and a curb. In addition, the directions including reporting distance intervals between an end of the vehicle and another vehicle. The distance reporting may be preformed by a visual count-down bar (for example, on the front A post) showing a lighted bar that decreases in length. It may begin to shorten only when reaching a specific distance.

The audio providing the directions comprises a series of tones. The control system may also provide the sequential directions by visual indication.

The visual indication may comprises a plurality of lights, or directions on a display.

In an embodiment, the directions are displayed on one of the front windshield and rear window. It may also be displayed on an A-pillar.

The directions may be displayed on a rear view mirror, or include a display having means for hanging below the rear view mirror.

A method for assisted parking for a vehicle, comprises the steps of:
- (a) sensing a position of a vehicle to be parked;
- (b) determining whether there are additional objects in a predetermined area adjacent the vehicle;
- (c) providing at least two-dimensional reconstruction of feedback of the position of the vehicle and the additional objects;

(d) determining whether positions of other vehicles adjacent the parking space provide sufficient clearance for the vehicle to be parked and providing a planned path indicating a path in which the vehicle to be parked will be maneuvered; and (e) maneuvering the vehicle to be parked based on the planned path determined by said path planning system, said control system controls vehicle steering, direction, speed, and application of brakes, so that the vehicle to be parked is automatically maneuvered into the parking space.

In another aspect of the present invention, a method for computer-based assisted parking of a vehicle into a parking space comprises the steps of:

(a) sensing a position of the vehicle to be parked in a predetermined area adjacent the vehicle;

(b) providing at least two-dimensional reconstruction of feedback received from the sensed position of the vehicle;

(c) determining whether positions of other vehicles adjacent the parking space provide sufficient clearance for the vehicle to be parked and providing a planned path indicating the directions in which the vehicle to be parked is to be maneuvered; and (d) providing a control system that includes one of at least audio or visual sequential instructions while the vehicle is being parked by the driver.

The sequential instructions may be provided in a summary prior to beginning the parking of the vehicle, and by one of visual and audio indications sequentially as the vehicle is being parked.

The sequential instructions include computer synthesized voice instructions, and the control system may update the sequential instructions to compensate for variations from the planned path while the vehicle is being parked.

DETAILED DESCRIPTION OF THE PREFERRED EMBODIMENTS

The following description, in conjunction with drawings, is provided for purposes of illustration and not for limitation. It is understood by persons of ordinary skill in the art that many modifications may be made that do not depart form the spirit of the invention and the scope of the appended claims.

Figure 1:
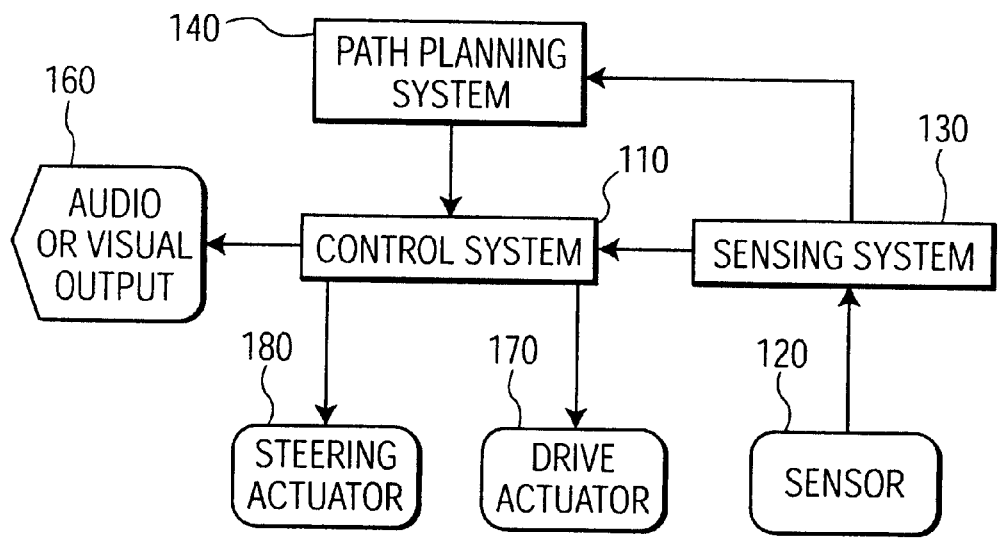
FIG. 1 is a schematic of a system according to an embodiment of the present invention.

FIG. 1 provides an illustration of a system according to the present invention. At the heart of the system is a control system 110, typically a computer having a storage area (not shown). A sensor 120 may be mounted in the roof of a vehicle, on the front and/or rear bumpers, or wherever on the car (e.g. sides) as desired. Typically, in a preferred mode, there would be, for example, one sensor in the front right corner and one sensor in the back right corner of the vehicle.

If the sensors are, for example, ultrasonic, it normally would give the range of the nearest location in a line of site, meaning that multiple sensors may be required to build an image of parked cars as well as the curb. There are ultrasonic range sensors known in the art which can detect a 3 cm object at over 2 meters, and they could be arranged for particular ranges (e.g. 150 HZ for 3 cm–1 m, 50 HZ for 3 cm–3 m, 25 Hz for 3 cm to 6 m). An advantage of ultrasonic sensors is that they can be used in light and dark conditions without a large variation in sensing capability.

It should be understood by persons of ordinary skill in the art that additional sensors can be arranged in additional areas, for example, on the front left corner and back left corner. Moreover, in countries where the steering wheel is on the right hand side and vehicles drive on the left side of the road, two sensors would typically be arranged on the front left side and back left side of the vehicle.

The sensor may also be a camera, and could operate in any known spectrum, such as infrared or visible light, to name a few. A person of ordinary skill in the art understands that a plurality of sensors can be arranged about the vehicle, as well as the parking area.

The use of a camera sensor rather than, for example, ultrasonic sensors is preferred since a camera can detect many objects simultaneously in an image. It is understood by persons of ordinary skill in the art that when it is dark, the camera may require additional lighting or additional infrared filter to see the parking spot. There can be more than one camera, arranged, for example at the right-front fender, and possibly one on the left front fender to park on the left side of a street. Alternatively, there can be a single camera mounted on the roof which is movable.

Applicants hereby incorporate by reference as background material the publication entitled Motion and Structure from Image Sequences, by Juyang Weng, Thomas S. Huang, and Narendra Ahuja, (Springer-Verlag 1993) pages 65–203, disclosing one way that motion and structure of a scene are related in the measurement of distances and depth of a scene by using a moving camera.

Thus, the vehicle position and orientation relative to the x1,y1, x2,y2 and curb locations can be achieved using a single camera. The x1,y1 and x2,y2 locations and depth of the spot form a "forbidden region" in two dimensions (i.e. the most obstructing points of the parked cars or curb, as measured to the ground), or optionally in three dimensions, to give overhead clearance as well. The distance traveled by the single camera is an important feature to provide proper calculations. One way to insure the accurate tracking of camera movement can be by using an odometer on the wheels, so that the rest of the scene's dimensions can be calculated.

The sensing system 130 accepts inputs from the sensor 120, and then performs reconstruction. This reconstruction can be two dimensional, or in a preferred embodiment of the invention, three-dimensional. For parallel parking, the system finds cars and the curb using model-based techniques. For head-in and parallel parking, the distance between the cars and depth of the space will be calculated.

The following explanation is one way that the present invention can be embodied to sense the x1,y1, x2,y2 and curb locations using a single camera. If there is one moving camera that is acquiring images of the scene, there can be recovery of both the motion and the structure of the scene up to one scale constraint.

For example, Let $P_0=(X_0,Y_0,Z_0)^T$ denote camera position in the reference frame (without a loss of generality it may be the first frame);

Let the camera perform rigid motion which can be described by rotation (orientation) matrix R (determined by three independent parameters, i.e. orientation angles) and translation vector T, and let camera motion parameters through the sequence be $(R_1, T_1)$, $(R_2, T_2), \ldots$, etc.

Let the structure (i.e. depth) of the scene points be $P_1, P_2, \ldots, P_n$ $(Z_1, Z_2, \ldots, Z_n)$.

Let s be an arbitrary, unknown scale factor.

If we are able to recover point correspondences between each two consecutive images in the video sequence, then, using Structure From Motion (SFM) algorithms, we can recover the following:

1. Orientation matrices: $R_1, R_2, \ldots$
2. Translation vectors up to s: $sT_1, sT_2, \ldots$
3. Structure (depths) up tolls: $P_1/s, P_2/s, \ldots, P_n/s$.

In order to determine the scale factor s, we have to know some reference distance in the scene, for example distance that camera traveled. If this distance is known, then s, and consequently, the scene structure, can be completely required.

The path planning system 140, receives the information from the sensing system 130, and plans a path for the vehicle to be maneuvered so as to park the vehicle, whether that parking is head-in or parallel parking. The path, in the form of setpoints or a computed configuration space, is read by the control system 110 and is used to define the finer, real-time motions.

In one aspect of the present invention, the vehicle steering actuator 180 and motion actuator 170 receive control signals from the control system to automatically maneuver the vehicle while parking. The control system 110 reads the current position and orientation from the sensing system 130. The control system 110 then determines control settings for the setpoint or state to the next planned setpoint or state. As disclosed in U.S. Pat. No. 5,870,303, the vehicle can be regarded as a robot defined by three parameters and two degrees of freedom, which are the positions of the two actuators (drive wheel position and fwd/reverse vector). The three parameters $(x,y,\phi)$ may be the axes of configuration space for the vehicle, because they uniquely define the position of the car. It should be understood that while any point related to the position of the car may also be chosen, planning calculations are simplified when symmetric (e.g. forward, reverse) motions of the tracking point are produced. For conventional vehicles this point is the midpoint of the rear axle (i.e. half way between the rear tires).

The vehicle may be considered a rectangle having a width and length, and an angle relative to a fixed reference angle. The wheels can be considered to have positions from, including but not limited to, angular positions to the left, right and center (straight).

Figure 2A:
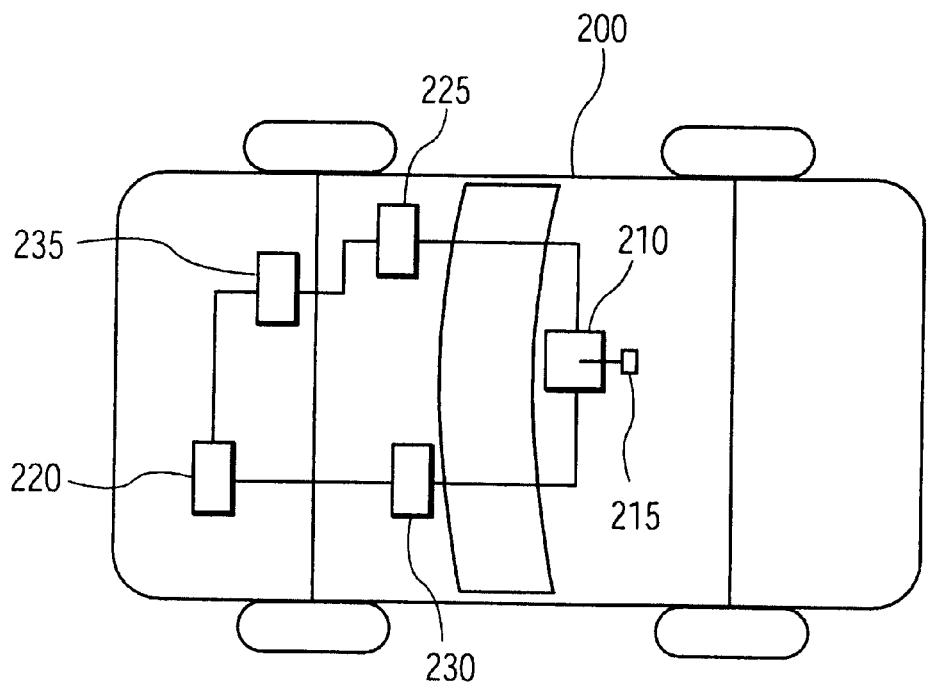
FIG. 2A illustrates detail of the control of the vehicles steering mechanism according to the present invention.

FIG. 2A illustrates one aspect of how the vehicle 200 can be steered automatically. The vehicle may be steered by a Drive-By-Wire system, such as disclosed by Daimler-Chrysler™. A drive-by-wire systems uses a joystick 215 to steer, accelerate, brake and signal turns. Thus, there is no need for a steering wheel, as well as brake and accelerator pedals. In addition, the drive-by-wire system should include a plurality of sensors and control elements that are connected by a data bus. The drive-by-wire system is capable of actively taking over driving of the vehicle when the driver loses control. Such a system is made by modifying the mechanical and hydraulic connections and substituting servomotors and switching elements.

A joystick 215 can be sensed (or transduced) to indicate to a control box 210 which functions should be performed. Servomotors 220, 225, 230 and 235 can be used in conjunction with switching elements to control the braking, acceleration, steering, and engagement of the transmission in a predetermined direction.

The control box 210 may comprise a fault-tolerant computer system that is used to control the drive-by-wire system, and all components should have backup or redundancies to maximize safety. A person of ordinary skill in the art understands that the computer system used to control the vehicle during an emergency can also be selectively activated to automatically park the vehicle, without requiring the driver to manipulate the joystick. Pressing an indicator on the joystick that signals the vehicle to park, or issuing a voice command to the system to park the vehicle are two possible ways that the system can be activated to park the car. Indicators (such as on the joystick, can be located anywhere).

In another aspect of the present invention, instead of automatically controlling the maneuvering of the vehicle, the control system may provide voice commands to park the vehicle. In this aspect of the invention, the audio or visual output 160 could be an additional screen on the dashboard, and/or light indicators placed on an A-pillar, and/or an additional speaker.

In addition, the speakers used with the car's sound system could also be used, and the directions may have priority over the music, wherein when a parking mode is activated, the music will be muted, but there will be voice commands instructing how to park the vehicle.

For example, U.S. Pat. No. 5,835,881 to Trovato et al. (the contents of which are hereby incorporated by reference as background material) discloses a system providing voice driving directions. However, in a novel and unobvious manner, the present invention would provide exact directions to turn the wheel, to go forward or backward, and may provide feedback in the form of distance intervals from the closest object in the direction that the vehicle is traveling. Alternatively, the distance intervals may indicate how much farther back one must go in reverse, so when the audio indicates "three feet" then "two feet" then "one foot" then, perhaps "six inches" then "STOP". Of course, the distance between the intervals and the recommended speed can be varied according to need. Moreover, the "stop" command could be followed by a collision avoidance override, where the car may automatically break to prevent impact with another object.

In a best mode, the planning system should take into account objects that are not stationary, such as pedestrians trying to cross a street in the area where the car is to be parked. Similar to the above, a collision avoidance override may be desirable. In fact, a collision avoidance override may desirable in the automatic maneuver of the first aspect of the present invention.

The directions may be displayed on the dashboard visually, and/or by voice. If the directions are displayed, they may be displayed on the front or rear windshield, or the side windows in lieu of the dashboard. It is known by persons of ordinary skill in the art to use the front or rear windshield as a display. Alternatively, the directions could also be displayed on a unit hanging below the rear view mirror.

Figure 2B:
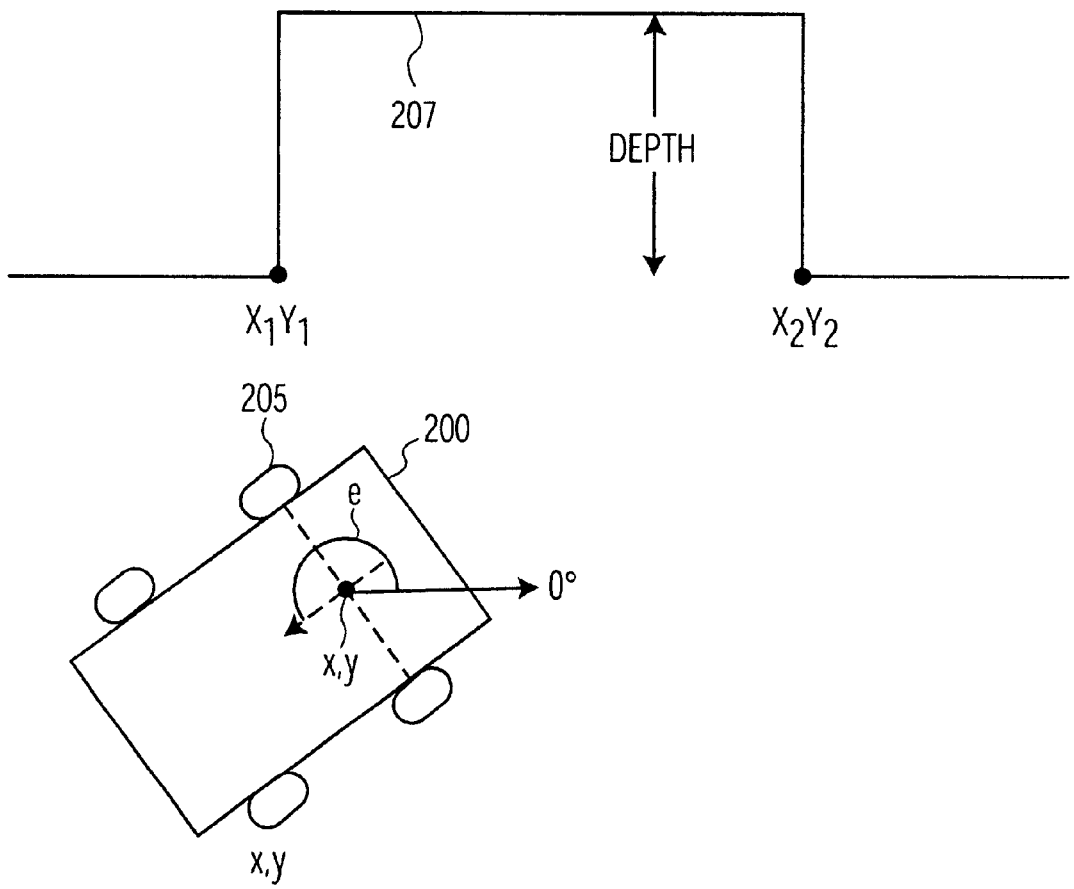
FIGS. 2B and 2C illustrates an embodiment of the reconstruction of points X1,Y1 and X2,Y2 according to the present invention.
Figure 2C:
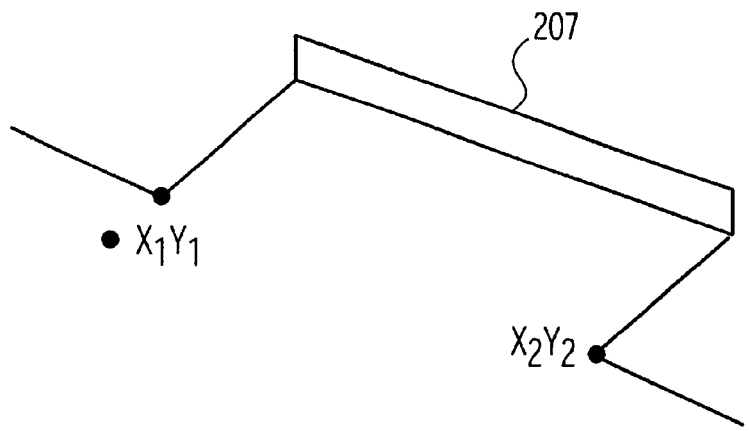

FIG. 2B illustrates how the points X1,Y1, and X2,Y2 can be reconstructed by the sensing system. Thus, only two point locations and the position and orientation of the controlled car are necessary. As shown in the illustration, a vehicle 200 having wheels 205 is to be parked in a space, and the sensing system generates a relative X,Y, and $\phi$ based on, for example, an outermost corner of each parked car so as to generate points X1,Y1 and X2,Y2. The curb 207, which is shown in a perspective view in FIG. 2C, is a boundary of the depth of the space. These points could be generated once and stored in the vehicle's computer and may be representative of the outermost corner of each car, or optionally, the contour of the car. The angle φ is taken, for example, from a center of the rear axle of the vehicle, but there could be other positions from which the angle is taken.

In other words, once a distance is sensed to park the car (for example, say there is 15 feet of space) the vehicle can have the maneuver to parallel park in a 15 foot parking spot stored in memory. Thus, if there is a 13 foot long parking spot, the amount of maneuvering can be different than a 15 foot spot depending of the coordinates of the car, as a large car may require several additional steps of changing directions and turning the wheels to fit into the parking space.

Optionally, the vehicle may have a sensor to monitor the distance from vehicle to the curb, so that not only is the area of the parking spot sensed, but the distance to the curb, which would typically be elevated from the street by at least two to four inches. Of course, variations in adjusting the curb sensing height may be changed according to need. By this feature, the vehicle can be parked within a prescribed distance range from the curb, so as to comply with local parking regulations.

The vehicle may have a sensor for determining the height of the parking space. This feature is extremely important for commercial vehicles, such as trucks, where drivers often misjudge the height of clearance of their vehicle. In fact, this feature could be active even when the vehicle is not being parked, so as to provide a safety warning of an overhead obstruction within an predetermined distance of the vehicle.

The sensors can also scan the ground for painted lines in a parking lot so that the vehicle is properly parked, for example, in a shopping center, even when there might not be adjacent vehicles. Some parking lots two vehicles that take two painted spots, so this feature would prevent such an occurrence.

It is also optional to provide a desired distance that the vehicle should be from an adjacent car, so that the driver may request additional "room" so as to safely open the door of the vehicle without either banging into an adjacent vehicle or object. In addition, drivers and/or passengers with special needs (such as walkers, canes, wheelchairs) may need additional clearance to exit the vehicle. This feature may also be desirable for a driver who has a small child in the vehicle and may have to remove a car seat, on unfold a baby carriage, etc.

Figure 3:
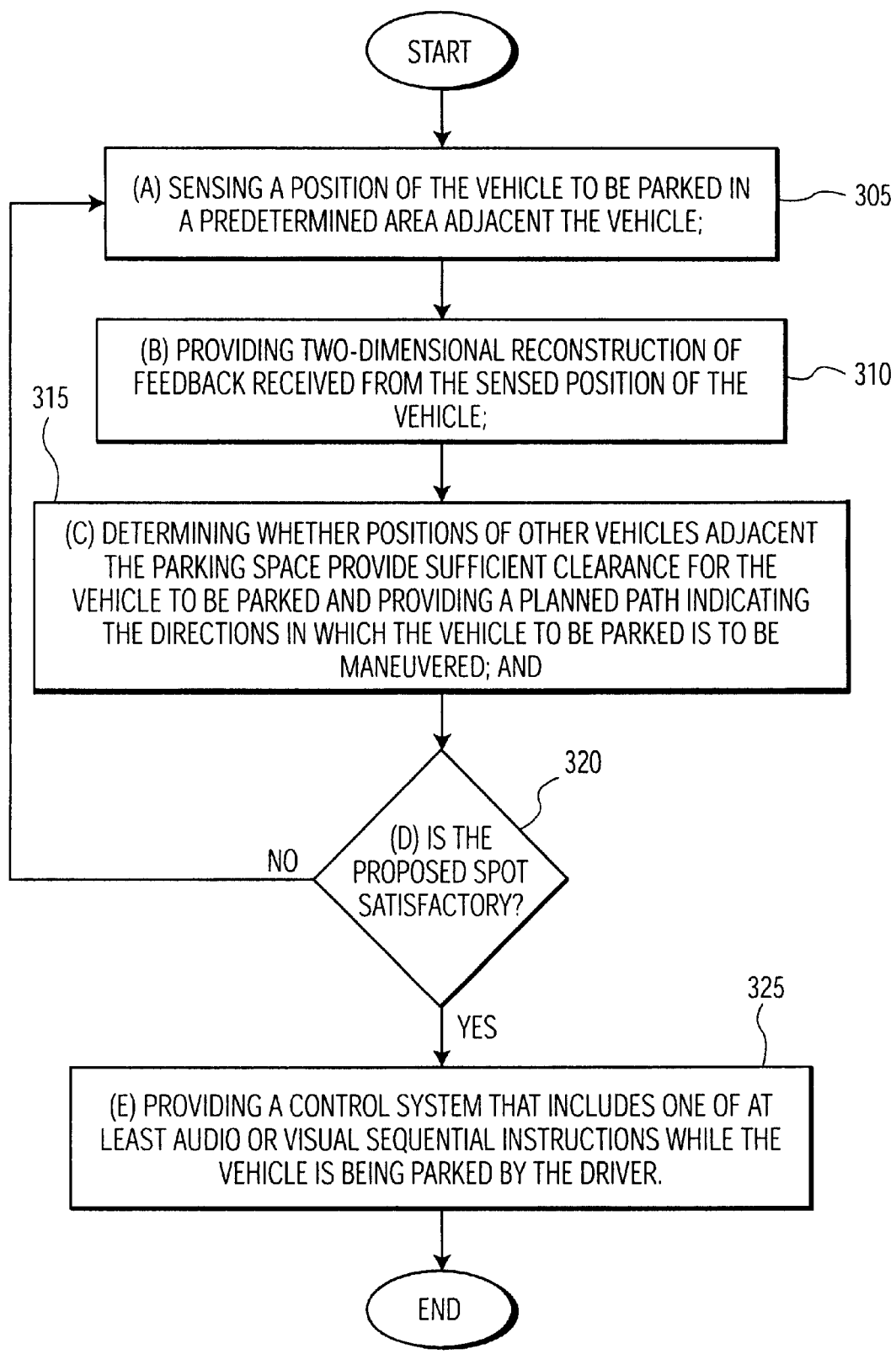
FIG. 3 is a flow chart illustrating one aspect of a method according to the present invention.

FIG. 3 is a flow illustrating one aspect of a method according to the present invention.

To begin the process, the speed of the car should be under 10 miles per hour so that vehicles following have a chance to stop.

At step 305, the position of the vehicle is sensed. The user may request the car to "hunt" for a spot by speaking or pressing a button relative to an adjacent vehicle.

At step 310, at least two-dimensional reconstruction of feedback received from the sensed position of the vehicle is provided. This would be provided by feedback from the sensor to generate relative X,Y coordinates of a parking spot and an angle φ, which can be an angle relative to the angle of the parked cars, angle of the curb, or an absolute compass direction that the vehicle is positioned from the parking spot. Thus, the distance of the spot is determined based on feedback from the sensors, which can be arranged on outer corners of the vehicle.

At Step 315, it is determined whether positions of other vehicles adjacent the parking space provide sufficient clearance for the vehicle to be parked and providing a planned path indicating the directions in which the vehicle to be parked is maneuvered. The driver must accept the proposed spot before going to step 320, otherwise the system returns to step 305.

At step 320, the driver must confirm that the proposed parking spot is acceptable to initiate the assisted parking. Otherwise, the process reverts to step 305 when a another potential parking spot is found.

At step 325, the control system provides at least one of audio and visual sequential instructions while the vehicle is being parked by the driver.

Various modifications may be made to the examples depicted in the present description that would be within the spirit of the invention and the scope of the appended claims. For example, the type of control system, whether it be automatic or provide voice directions, may or may not have a voice activated switch so that a driver can turn on or off the assistant, or can provide instructions by saying a word or words recognized by the system as a basis to proceed.

What is claimed is:

1. A computer-based assisted parking system for parking a vehicle into a parking space, said system comprising:

at least one sensor arranged to sense a position of the vehicle to be parked in a predetermined area adjacent the vehicle;

a sensing system for at least two-dimensional reconstruction of feedback received from said at least one sensor;

a path planning system for determining whether positions of other vehicles adjacent the parking space provide sufficient clearance for the vehicle to be parked and providing a planned path indicating how the vehicle to be parked will be maneuvered;

a control system for controlling maneuvering of the vehicle to be parked based on the planned path determined by said path planning system, said control system controls vehicle steering, direction, speed, and application of brakes, so that the vehicle to be parked is maneuvered into the parking space.

2. The system according to claim 1, wherein the control system automatically parks the vehicle after a driver of the vehicle to be parked affirms that said path planning system has indicated that there is sufficient clearance for parking the vehicle.

3. The system according to claim 2, further comprising a switch in communication with at least one of said path planning system and said control system, so that the vehicle is parked automatically when the driver affirms receipt of the determination by said path planning system of sufficient clearance for parking the vehicle.

4. The system according to claim 2, wherein said control system includes an actuator for initiating parking of the vehicle.

5. The system according to claim 4, wherein the actuator is voice activated.

6. The system according to claim 4, wherein the path planning system includes a visual indicator to alert a driver of sufficient clearance for parking by the vehicle.

7. The system according to claim 4, wherein the path planning system includes an audio indicator to alert a driver of sufficient clearance for parking by the vehicle.

8. The system according to claim 2, wherein said control system further comprises an emergency stop feature to suspend parking of a vehicle if an object appears in the path determined by the path planning system.

9. The system according to claim 2, wherein said sensing system generates X,Y coordinates and an angle φ measured from a predetermined area of the vehicle so that said planning system provides the planned path indicating how the vehicle will be parked.

10. The system according to claim 9, where the planned path is retrieved from storage for a predetermined range of coordinates and angle φ.

11. The system according to claim 9, further comprising a curb height sensor for sensing a height of the curb to calculate a distance from the vehicle to the curb.

12. The system according to claim 9, further comprising a sensor for detecting clearance for a height of the vehicle in the parking space.

13. A computer-based assisted parking system for parking a vehicle into a parking space, said system comprising:

at least one sensor arranged to sense a position of the vehicle to be parked in a predetermined area adjacent the vehicle;

a sensing system for at least two-dimensional reconstruction of feedback received from said at least one sensor;

a path planning system for determining whether positions of other vehicles adjacent the parking space provide sufficient clearance for the vehicle to be parked and providing a planned path indicating how the vehicle to be parked will be maneuvered;

a control system for controlling maneuvering of the vehicle to be parked based on the planned path determined by said path planning system, wherein said control system provides sequential directions to the driver to park the vehicle as the driver is maneuvering the vehicle into the parking spot.

14. The system according to claim 13, wherein the control system provides the sequential directions by audio.

15. The system according to claim 14, wherein the audio providing the directions comprises a synthesized voice.

16. The system according to claim 14, wherein the directions include reporting distance intervals between an end of the vehicle and a curb.

17. The system according to claim 15, wherein the directions including reporting distance intervals between an end of the vehicle and another vehicle.

18. The system according to claim 15, further comprising an emergency stop feature to suspend parking of a vehicle if an object appears in the path determined by the path planning system.

19. The system according to claim 14, wherein the audio providing the directions comprises a series of tones.

20. The system according to claim 13, wherein the control system provides the sequential directions by visual indication.

21. The system according to claim 17, wherein the visual indication comprises a plurality of lights.

22. The system according to claim 17, wherein the visual indication comprises directions on a display.

23. The system according to claim 17, wherein the directions are displayed on one of the front windshield and rear window.

24. The system according to claim 17, wherein the directions are displayed on a rear view mirror.

25. The system according to claim 17, wherein the control system includes a display including means for hanging below the rear view mirror.

26. A method for assisted parking for a vehicle, comprising the steps of:

(a) sensing a position of a vehicle to be parked;

(b) determining whether there are additional objects in a predetermined area adjacent the vehicle;

(c) providing at least two-dimensional reconstruction of feedback of the position of the vehicle and the additional objects;

(d) determining whether positions of other vehicles adjacent the parking space provide sufficient clearance for the vehicle to be parked and providing a planned path indicating a path in which the vehicle to be parked will be maneuvered; and (e) maneuvering the vehicle to be parked based on the planned path determined by said path planning system, said control system controls vehicle steering, direction, speed, and application of brakes, so that the vehicle to be parked is automatically maneuvered into the parking space.

27. A method for computer-based assisted parking of a vehicle into a parking space, said method comprising the steps of:

(a) sensing a position of the vehicle to be parked in a predetermined area adjacent the vehicle;

(b) providing at least two-dimensional reconstruction of feedback received from the sensed position of the vehicle;

(c) determining whether positions of other vehicles adjacent the parking space provide sufficient clearance for the vehicle to be parked and providing a planned path indicating the directions in which the vehicle to be parked is to be maneuvered; and (d) providing audio or visual sequential instructions by a control system while the vehicle is being parked by the driver.

28. The method according to claim 27, wherein the sequential instructions are provided in a summary prior to beginning the parking of the vehicle, and by one of visual and audio indications sequentially as the vehicle is being parked.

29. The method according to claim 28, wherein the sequential instructions include computer synthesized voice instructions, and the control system updates the sequential instructions to compensate for variations from the planned path to park the vehicle.

* * * * *